United States Patent
Rochefort et al.

(10) Patent No.: US 10,145,101 B2
(45) Date of Patent: Dec. 4, 2018

(54) METHOD AND APPARATUS FOR MANUFACTURING AN INSULATION PANEL

(75) Inventors: Malcolm Rochefort, Ludlow (GB); Adrian Pargeter, West Midlands (GB)

(73) Assignee: Kingspan Holdings (IRL) Limited, Kingscourt, County Cavan (IE)

(*) Notice: Subject to any disclaimer, the term of this patent is extended or adjusted under 35 U.S.C. 154(b) by 781 days.

(21) Appl. No.: 14/129,682

(22) PCT Filed: Jun. 27, 2012

(86) PCT No.: PCT/IE2012/000033
§ 371 (c)(1),
(2), (4) Date: Mar. 4, 2014

(87) PCT Pub. No.: WO2013/001522
PCT Pub. Date: Jan. 3, 2013

(65) Prior Publication Data
US 2014/0182766 A1 Jul. 3, 2014

(30) Foreign Application Priority Data
Jun. 27, 2011 (IE) .................................... 2011/0301

(51) Int. Cl.
*E04B 1/76* (2006.01)
*B29C 43/26* (2006.01)
(Continued)

(52) U.S. Cl.
CPC ............ *E04B 1/7658* (2013.01); *B29C 43/26* (2013.01); *B29C 43/28* (2013.01); *B29C 43/48* (2013.01);
(Continued)

(58) Field of Classification Search
CPC ...... B29C 2043/3427; B29C 2043/483; B29C 43/26; B29C 43/28; B29C 43/48; E04B 1/7658
See application file for complete search history.

(56) References Cited

U.S. PATENT DOCUMENTS 4,298,387 A * 11/1981 Kratel .................... C04B 30/00
501/126
4,992,227 A 2/1991 Brossy
(Continued)

FOREIGN PATENT DOCUMENTS

DE 10339679 A1 3/2005
EP 1674227 A2 6/2006
(Continued)

*Primary Examiner* — Christopher T Schatz
(74) *Attorney, Agent, or Firm* — Harness, Dickey & Pierce, P.L.C.

(57) ABSTRACT

A microporous insulation material mixture is blended and the blended mixture is spread across a lower conveyor belt which is trained over rollers. To aid the spreading of the mixture a spreading device is used. The mixture is delivered by the conveyor to a pressing system which in this case comprises an upper conveyor belt. The pressing system also comprises a nipping means provided in this case by a plurality of upper and lower nipping rollers. The gaps between the individual rollers are adjustable. An upper fleece liner is led from a delivery roller to lie between the upper conveyor belt and the insulation mixture and a lower fleece liner is fed from a delivery roller to lie between the insulation mixture and the lower conveyor belt. The fleece liners may be used to encase the core prior to enclosing in an envelope and applying a vacuum.

10 Claims, 5 Drawing Sheets

(51) Int. Cl.
*B29C 43/28* (2006.01)
*B29C 43/48* (2006.01)
*E04B 1/80* (2006.01)
*B29C 43/34* (2006.01)

(52) U.S. Cl.
CPC ...... *E04B 1/803* (2013.01); *B29C 2043/3427* (2013.01); *B29C 2043/483* (2013.01); *Y02A 30/242* (2018.01); *Y02B 80/12* (2013.01)

(56) References Cited

U.S. PATENT DOCUMENTS

| | | | | |
|---|---|---|---|---|
| 5,090,981 | A * | 2/1992 | Rusek, Jr. | B29C 70/50 264/102 |
| 5,472,541 | A * | 12/1995 | Simmons | B05C 19/04 156/231 |
| 5,802,857 | A * | 9/1998 | Radkowski | B08B 7/0092 62/303 |
| 6,235,806 | B1 * | 5/2001 | Ohga | B29C 44/025 264/101 |
| 2004/0048049 | A1 * | 3/2004 | Merrill | B32B 5/18 428/209 |
| 2006/0105661 | A1 | 5/2006 | Steinbach | |
| 2007/0014995 | A1 * | 1/2007 | Chacko | C03C 25/26 428/430 |
| 2008/0248303 | A1 * | 10/2008 | Maurer | C03C 25/146 428/378 |
| 2009/0151847 | A1 | 6/2009 | Zhamu et al. | |
| 2010/0095622 | A1 * | 4/2010 | Niemoller | B32B 3/12 52/407.5 |

FOREIGN PATENT DOCUMENTS

| | | |
|---|---|---|
| GB | 1397683 A | 6/1975 |
| WO | 90/06841 | 6/1990 |
| WO | 03/072331 A1 | 9/2003 |
| WO | 2011/077188 A1 | 6/2011 |

* cited by examiner

METHOD AND APPARATUS FOR MANUFACTURING AN INSULATION PANEL

This is a national stage of PCT/IE12/00033 filed Jun. 27, 2012 and published in English, which has a priority of Irish no. 2011/0301 filed Jun. 27, 2011, hereby incorporated by reference.

INTRODUCTION

This invention relates to vacuum insulation panels (VIP). Current VIP technology generally comprises a single panel of insulation material formed typically of fumed silica, fibre and/or other microporous material core, which may or may not contain infra red opacifiers, the core wrapped in a flexible, gas-tight envelope and a vacuum applied before sealing. The vacuum is essential to the panel's thermal insulating performance. Thermal conductivity properties of VIPs are typically of the order of 0.005 W/mK. If the vacuum is lost the panel loses a large proportion of its effectiveness as a thermal insulator, with the thermal conductivity reverting to that of the core material, which is typically above 0.020 W/m.K. To reduce the effects of damage to an insulation system, it is therefore useful to divide a VIP into smaller compartments. The advantage is that loss of vacuum in one compartment will not affect adjacent compartments.

The use of VIP technology in construction is not widespread but could enable improved insulation properties and allow a significant reduction in thickness of insulation materials required to meet ever increasing requirements for thermal efficiency of buildings.

The production of such vacuum insulation panels on a factory scale is a challenge that restricts the application of such panels in construction applications.

STATEMENTS OF INVENTION

According to the invention there is provided a process for manufacturing a vacuum insulation panel comprising the steps of:
 providing a microporous insulation material mixture;
 leading the material to a continuous pressing means;
 pressing the material to provide a continuous sheet of pressed insulation core material;
 cutting the pressed continuous sheet to a desired size to provide an insulation core;
 encasing the core in a flexible envelope; and
 applying a vacuum to evacuate the envelope so that the envelope closely engages the insulation core.

In one embodiment the process comprises pressing the material to provide a continuous sheet of substantially uniform thickness.

The process preferably comprises pressing the material in a number of stages to progressively press the material from an initial thickness to a smaller thickness. This feature enhances the compaction on a continuous basis.

In one case the system comprises a pre-compression step which may be provided by additional rollers. This gives the advantage of a longer more gradual de-aeration of the mixture prior to entering the main pressing zone. In the case where an air permeable sheet such as a fleece material is applied additional air can escape through the fleece. This reduces the risk of air entrapment and facilitates optimisation of the line speed with increased output.

In one case the process comprises pressing the material in a first stage to reduce the initial thickness, in an intermediate stage to further reduce the thickness, and in a final stage to reduce the thickness to a desired thickness of insulation core material.

The process may involve pressing the insulation material mixture to reduce the thickness of the mixture by a factor of at least 50%, typically by a factor of about 80%.

In one case the material is pressed by leading it through a nipping means such as a nip roller means.

In one embodiment the process comprises leading the material between a pair of spaced-apart conveyor belts.

In one case the insulation material mixture is delivered onto a conveyor belt for pressing. The process may comprise the step of spreading the material across the conveyor belt.

In one embodiment the process comprises applying a release agent to the conveyor belt, prior to delivery of the insulation material mixture onto the belt.

In another embodiment the process comprises cleaning the belt after removal of the pressed sheet from the belt.

In one case the insulation material comprises fibres which serve to bind the pressed material together. The fibres may be of organic or inorganic material. In one case the fibres comprise polyester or polypropylene fibres. The insulation material may comprise fumed silica. The insulation material may comprise infra red absorbing powdered material (IR opacifier). The insulation material may comprise microporous materials, such as silica, perlite, diatomaceous earth, and especially fumed silica, and these microporous materials are typically mixed with infra red absorbing materials (IR opacifiers) such as carbon black, titanium dioxide, iron oxides, magnetite, or silicon carbide.

In one embodiment the process comprises controlling the level of moisture in the insulation material mixture. Heat may be applied to control the level of moisture in the insulation material mixture.

In one case the process comprises encasing the insulation core in an air permeable cover prior to encasing the core in a flexible envelope.

In one embodiment the process comprises applying an air permeable carrier or fleece to one or both of the conveyor belts. The air permeable carrier may be to form an air permeable casing around the pressed insulation core.

The apparatus may comprise a pre-compression zone. The pre-compression zone may be provided by rollers applied to the upper fleece liner.

The invention also provides apparatus for manufacturing a vacuum insulation panel comprising:
 a conveyor for receiving a microporous insulation material mixture; and
 pressing means for compacting the insulation material mixture on the conveyor to provide a continuous sheet of pressed insulation core material.

Preferably the pressing means progressively compacts the material in a number of stages from an initial thickness to a smaller thickness and provides a continuous sheet of pressed insulation core material of substantially uniform thickness. This feature enhances the compaction on a continuous basis.

In one case the system comprises a pre-compression zone which may be provided by additional rollers applied. This gives the advantage of a longer more gradual de-aeration of the mixture prior to entering the main pressing zone. In the case where an air permeable sheet such as a fleece material is applied additional air can escape through the fleece. This reduces the risk of air entrapment and facilitates optimisation of the line speed with increased output.

In one embodiment the apparatus comprises a nipping means for pressing the insulation material. In one case this is a first nipping means for gradually reducing the thickness of the insulation material mixture and a second nipping means for setting the final thickness of the pressed core sheet.

The conveyor may comprise a conveyor belt. The apparatus may comprise a spreader for spreading the mixture across the conveyor belt. In one case, the spreader device consists of counter-rotating blades, which may be fabricated from fine toothed or plain material, which serve to spread the mix across the belt from a central pouring position.

In one case this conveyor belt comprises sections with controlled reduction in height (distance between the belts) for controlled de-aeration and compaction of the powder mix.

In one embodiment there is an applicator means for applying a release agent to the conveyor.

In one case there is a belt cleaning means for cleaning the belt after removal of the sheet of insulation core.

The apparatus may comprise heating means for heating the pressed sheet to control the level of moisture.

In one embodiment the apparatus comprise cutting means for cutting the continuous insulation core sheet into panels of a required size.

In one case the apparatus comprises a stacker for stacking the cut core sheets.

The invention also provides a vacuum insulating panel (VIP) formed from a continuously pressed sheet as described.

BRIEF DESCRIPTION OF THE DRAWINGS

The invention will be more clearly understood from the following description of an embodiment thereof, given by way of example only, with reference to the accompanying drawings, in which.

DETAILED DESCRIPTION

Figure 1:
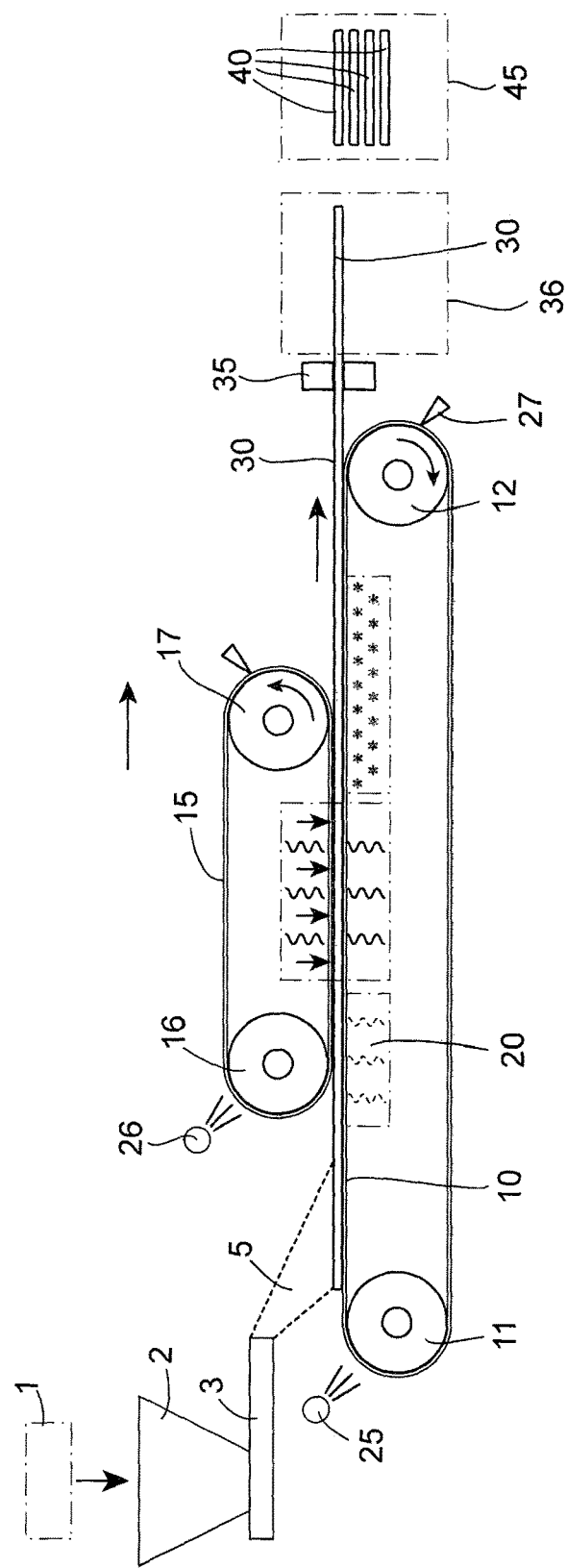
FIG. 1 is an elevational view of an apparatus for manufacturing vacuum insulating panels according to the invention.

Referring to the drawings, there is illustrated apparatus for manufacturing vacuum insulation panels 60 on a factory scale. The invention provides equipment and methods for continuous mass production of the core materials for such vacuum insulation panels. The invention enables a continuous compressed core to be formed and easily cut into smaller sections.

A microporous insulation material mixture to form an insulation core may comprise any suitable insulating material such as pressed fumed silica premixed with fibres and IR opacifier. If the insulating material is in the form of particulates, the particulates may be bound together to facilitate forming into a described shape, for example using a suitable binder. The mixture may for example, comprise fumed silica, IR opacifier, and fibres of organic or inorganic material.

Referring initially to FIG. 1 the mixture is blended in a blender 1 and on demand, the blended mixture is delivered on a continued or batch basis into a feed hopper 2 with an outlet lending to a delivery means such as a screw conveyor 3 or the like. The mixture 5 is spread across a continuously running lower conveyor belt 10 which is trained over conveyor rollers 11, 12. The mixture 5 is then pressed, in this case using a nipping means provided by an adjustable gap between the lower conveyor belt 10 and an upper conveyor belt 15 which is trained over rollers 16, 17. As the mixture is compressed it may be heated to further consolidate the insulation material as it is compacted. For example, at least part of the compacting system may be encased in a housing provided with a controlled environment through which heated air may be passed. Alternatively or additionally, the conveyor belt 10 and/or the conveyor belt 15 may be heated using a heated bed 20 which may be in a number of sections which can be separately controlled. As the mixture is compacted, the side edges of the mixture may be confined for example by using side flights against which the mixture impacts to retain it between the conveyors 10, 15.

To ensure the smooth running of the conveyors a release agent may be applied to the belt(s) prior to contacting the mixture. For example, spray heads 25, 26 may be provided to spray a release agent onto the surface of the conveyor(s). To further clean the belt 10 it may be led over a scrapper such as a blade 27.

The apparatus produces a continuous sheet 30 of pressed insulation core material which is led from the conveyor 10 to a metering device 35 and is then cut using a cutting means 36 to provide insulation cores 40 of a desired size and shape. These cores 40 may then be stacked using a stacker 45.

In one case the insulation material mixture is compressed from a thickness of about 80 mm to about 20 mm. The size of the final cut core sheets may be 300 mm×300 mm to up to 1200 mm×2400 mm.

To enhance the compaction on a continuous basis the nip may vary from an initial stage to a final stage. Indeed, there may be more than one nipping means to achieve this. For example, there may be an initial nip roller set at a greater thickness than the main nipping means.

Figure 2:
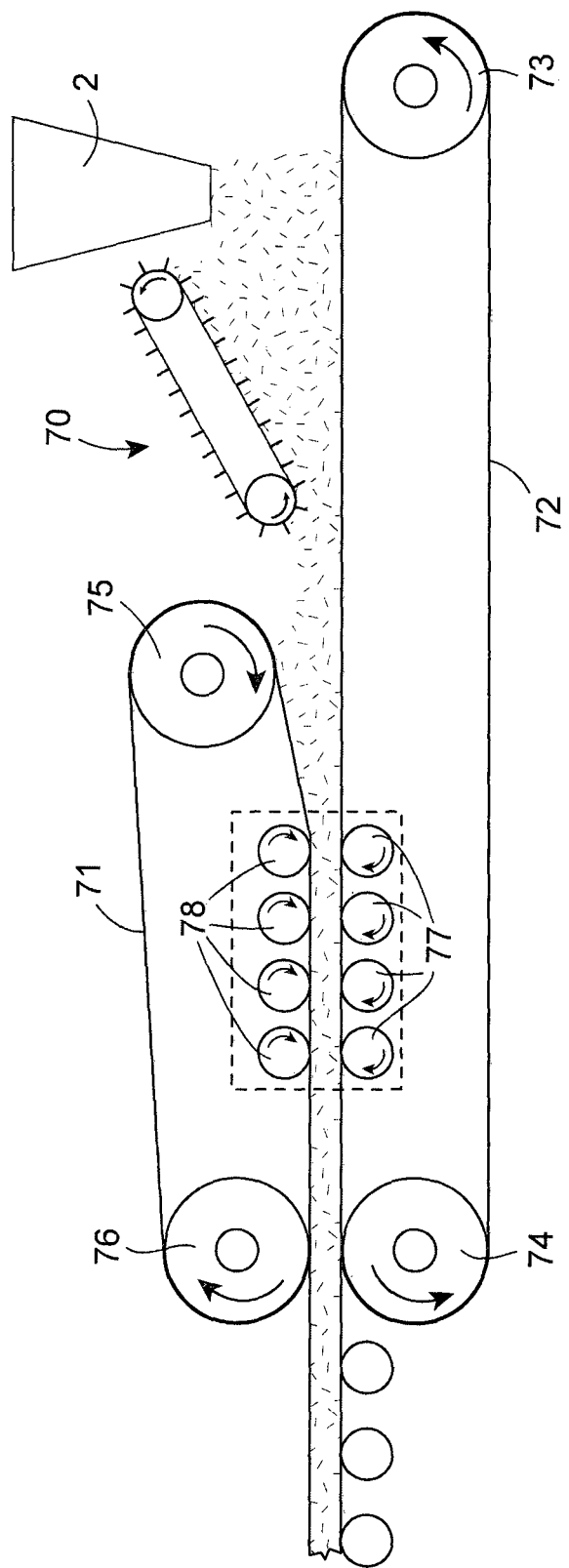
FIG. 2 is an elevational view of another apparatus according to the invention.

Referring to FIG. 2 in this case the blended mixture is spread across a lower conveyor belt 72 which is trained over rollers 73, 74. In the case illustrated the bottom belt 72 is flat. To aid the spreading of the mixture a spreading device 70 is used. The spreading device 70 may comprise counter-rotating blades which serve to spread the mixture across the belt 72 from a central pouring/delivery location. The spreader unit 70 is moved counter clockwise to the main belt 72 direction. The spreader unit 70 extends in this case across the full width of the main belt 72 to ensure an even spread of the mixture. The spreader 70 can be used to set the height of the material being delivered onto the belt 72 and may be adjustable to suit bulk density and the required final thickness of the core. For example, the spreader unit 70 may be set to provide a depth of 100 mm of material above the belt 72.

The mixture is delivered by the conveyor 70 to a pressing system which in this case comprises an upper conveyor belt 71 which is trained over rollers 75, 76. The upper roller 75 at the inlet end is located to provide a lead-in pressing action. For example, the roller 75 may be set to press the material to a depth of about 50 mm above the main conveyor belt 72. The pressing system also comprises a nipping means provided in this case by a plurality of upper and lower nipping rollers 78, 77. The gaps between the individual rollers 78, 77 is adjustable. For example, the first rollers 78, 77 at the input end may be set to a gap of 25 mm and the others set to gradually reduce the gap to about 20 mm between the final rollers 78, 77 at the output end.

A liner sheet such as a fleece liner may be provided and delivered continuously to the conveyor and the mixture may be applied to this liner sheet. This liner sheet may be removed after formation of the pressed insulation core. Similarly a top liner may be provided for the upper face of the mixture. Such a top liner may also be removed after core formation. Such liners may also be used as internal fleece during VIP formation.

Figure 3:
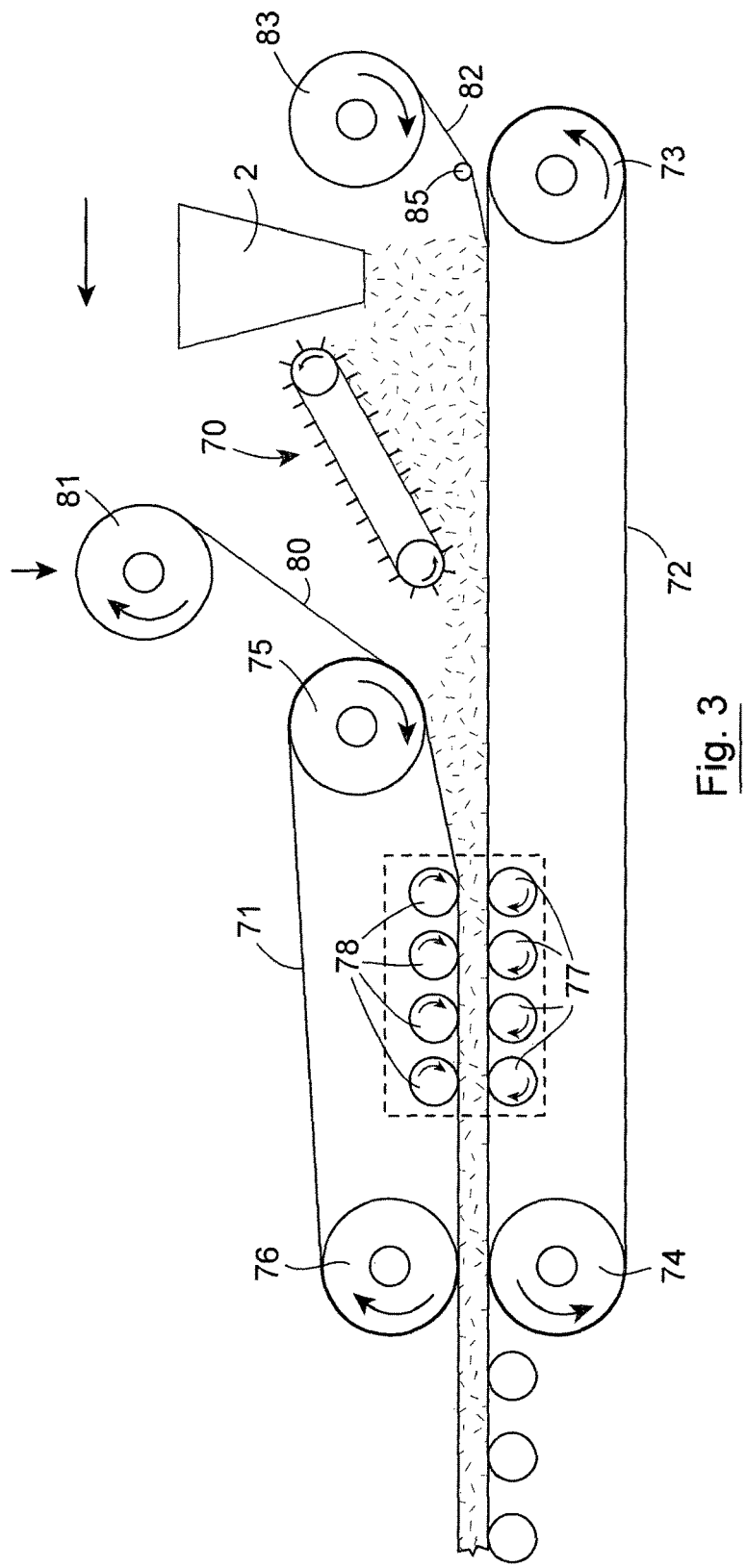
FIG. 3 is an elevational view of a further apparatus according to the invention.

FIG. 3 illustrates a system which is similar to that described with reference to FIG. 2 and like parts are assigned the same reference numerals. In this case an upper fleece liner 80 is fed from a delivery roller 81 to lie between the upper conveyor belt 71 and the insulation mixture. Similarly, a lower fleece liner 82 is fed from a delivery roller 83 to lie between the insulation mixture and the lower conveyor belt 72. The fleece liner(s) 80, 82 may be trained over guide rollers 85. The fleece liners 80, 82 may continue through the process.

Alternatively, mesh may be used to form a mesh bag around each core 45.

Figure 6:
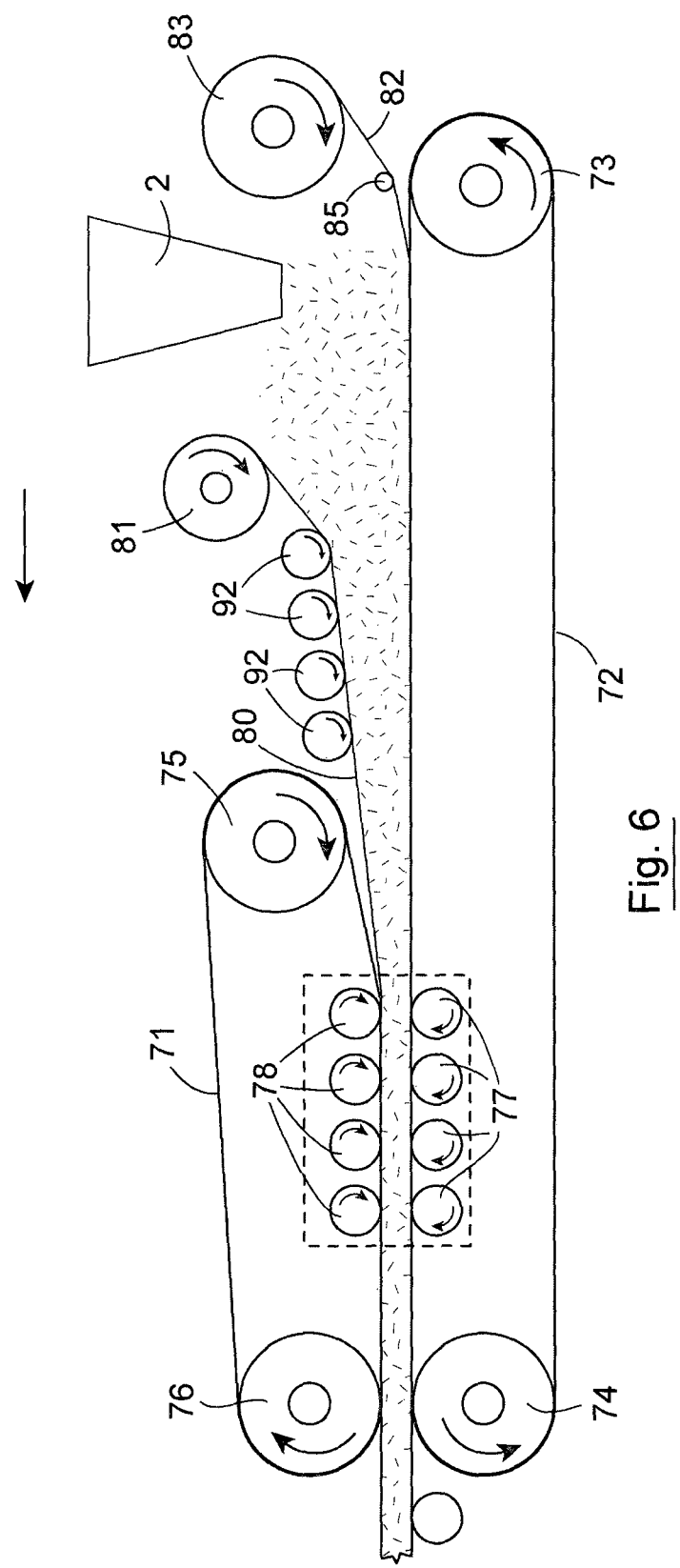
FIG. 6 is an elevational view of another apparatus according to the invention.

Referring to FIG. 6 there is illustrated a system which is similar to those previously described and like parts are assigned the same reference numerals. In this case the system comprises a pre-compression zone which in this case is provided by additional rollers 92 applied to the upper fleece liner 81. This gives the advantage of a longer more gradual de-aeration of the mixture prior to entering the main pressing zone. Because the fleece 81 is porous additional air can escape through the fleece. This reduces the risk of air entrapment and facilitates optimisation of the line speed with increased output.

Figure 5:
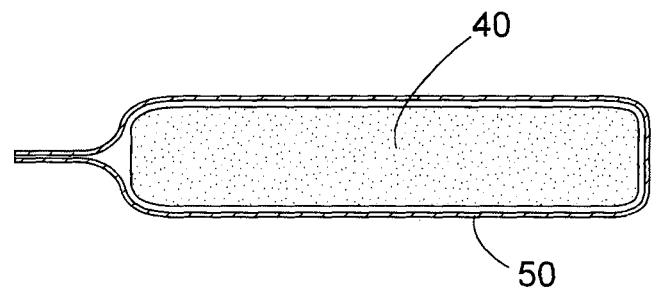
FIG. 5 is a cross sectional view of the panel of FIG. 2.
Figure 4:
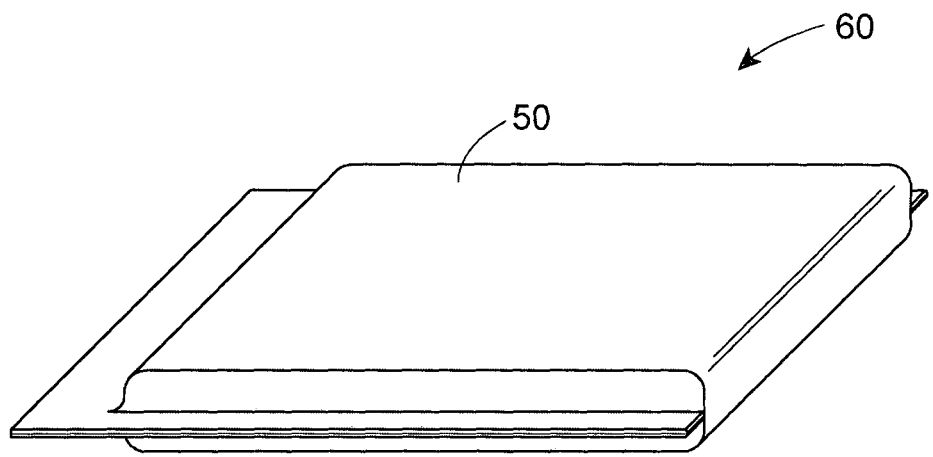
FIG. 4 is a perspective view of a typical vacuum insulating panel.

To form a vacuum insulation panel 60 a core 40 is encased in a foil envelope 50 and a vacuum is applied to draw all air from the envelope so that the envelope closely confines the core 40 as illustrated in FIGS. 4 and 5.

Modifications and additions can be made to the embodiments of the invention described herein without departing from the scope of the invention. For example, while the embodiments described herein refer to particular features, the invention includes embodiments having different combinations of features. The invention also includes embodiments that do not include all of the specific features described.

The invention is not limited to the embodiments hereinbefore described, with reference to the accompanying drawings, which may be varied in construction and detail.

The invention claimed is:

1. A process for manufacturing a vacuum insulation panel comprising the steps of: blending a microporous insulation material mixture comprising fumed silica, an IR opacifier and an organic binder; leading the mixture to a continuous pressing means comprising a pair of spaced apart conveyor belts; progressively pressing the mixture by progressively increasing compression of the mixture in a number of stages to press the mixture from an initial thickness to a smaller thickness and further consolidating the mixture to provide a continuous sheet of pressed insulation core material of substantially uniform thickness; cutting the pressed continuous sheet to a desired size to provide an insulation core; applying an air permeable carrier to one or both of the conveyor belts, encasing the insulation core in the air permeable carrier; and subsequently encasing the insulation core in a flexible envelope; and applying a vacuum to evacuate the envelope so that the envelope closely engages the insulation core.

2. The process as claimed in claim 1 wherein the step of progressively pressing comprises pressing the mixture in a first stage to reduce the initial thickness, in an intermediate stage to further reduce the thickness, and in a final stage to reduce the thickness to the smaller thickness of insulation core material.

3. The process as claimed in claim 1 wherein the step of progressively pressing comprises pressing the mixture to reduce the thickness of the mixture by at least 50%.

4. The process as claimed in claim 1 wherein the step of progressively pressing comprises pressing the mixture to reduce the thickness of the mixture by about 80%.

5. The process as claimed in claim 1 wherein the mixture is pressed by leading it through a nipping means.

6. The process as claimed in claim 5 wherein the nipping means comprises a nip roller means.

7. The process as claimed in claim 1 further comprising applying a release agent to at least one of the conveyor belts, prior to delivery of the mixture onto the belt.

8. The process as claimed in claim 1, wherein the mixture comprises fibres.

9. The process as claimed in claim 1 further comprising controlling moisture levels within the mixture.

10. The process as claimed in claim 9 further comprising applying heat to control the level of moisture in the mixture.

* * * * *